US008880033B2

(12) United States Patent
Abdallas

(10) Patent No.: US 8,880,033 B2
(45) Date of Patent: Nov. 4, 2014

(54) SCALABLE ADDRESSING OF MACHINE-TO-MACHINE TERMINALS IN COMMUNICATION NETWORKS

(71) Applicant: Telefonaktiebolaget L M Ericsson (publ), Stockholm (SE)

(72) Inventor: Isam Abdallas, Irving, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/745,418

(22) Filed: Jan. 18, 2013

(65) Prior Publication Data
US 2014/0206314 A1    Jul. 24, 2014

(51) Int. Cl.
G06F 15/16 (2006.01)
H04W 12/06 (2009.01)

(52) U.S. Cl.
CPC .................................... *H04W 12/06* (2013.01)
USPC .......................................... 455/411; 455/410

(58) Field of Classification Search
USPC ........ 455/410, 411, 434, 435.1; 370/259, 328
See application file for complete search history.

(56) References Cited

U.S. PATENT DOCUMENTS

2012/0196600 A1* 8/2012 Mizukoshi ................. 455/435.1

FOREIGN PATENT DOCUMENTS

WO    WO-2011057668 A1    5/2011

OTHER PUBLICATIONS

3GPP. 3rd Generation Partnership Project; Technical Specification Group Services and System Aspects; Study on Facilitating Machine to Machine Communication in 3GPP Systems; (Release 8) 3GPP TR 22.868 v8.0.0 (Mar. 26, 2007).
3GPP. Technical Specification 3rd Generation Partnership Project; Technical Specification Group Services and System Aspects; General Packet Radio Service (GPRS) enhancements for Evolved Universal Terrestrial Radio Access Network (E-UTRAN) access(Release 11). 3GPP TS 23.401 v11.0.0 (Dec. 16, 2011).
3GPP. Technical Specification 3rd Generation Partnership Project; Technical Specification Group Core Network and Terminals; Non-Access-Stratum (NAS) protocol for Evolved Packet System (EPS); Stage 3(Release 11). 3GPP TS 24.301 v11.1.0 (Dec. 20, 2011).
Neustar: "Proposed changes to Conclusion section for TR22.988," 3GPP Draft; S1-113077, 3rd Generation Partnership Project (3GPP), Mobile Competence Centre; 650, Route des Lucioles; F-06921 Sophia-Antipolis Cedex; France, vol. SA WG1, no. San Francisco, CA, US. Nov. 8, 2011.

* cited by examiner

*Primary Examiner* — Sam Bhattacharya

(57) ABSTRACT

A system and method is provided to accommodate an attach request for machine-to-machine ("M2M") terminals including a machine international mobile subscriber identity ("M-IMSI") in communication networks. In one embodiment, an apparatus of the system is operable to process the M-IMSI attach request from the M2M terminal. The apparatus includes a processor and memory including computer program code configured to receive the attach request from the M2M terminal including a machine identity type and an assigned M-IMSI from the M2M terminal, check an identity type of the attach request and transmit the attach request to a machine home server ("MHS") if the identity type is the M-IMSI. The processor and memory including computer program code of the apparatus are also configured to receive an authenticate response from the MHS indicating acceptance or rejection of the attach request and provide the authenticate response to the M2M terminal.

28 Claims, 5 Drawing Sheets

SCALABLE ADDRESSING OF MACHINE-TO-MACHINE TERMINALS IN COMMUNICATION NETWORKS

TECHNICAL FIELD

The present invention is directed, in general, to communication systems and, more specifically, to a system and method to accommodate an attach request for machine-to-machine terminals in communication networks using a machine international mobile subscriber identity.

BACKGROUND

Demand for machine-to-machine ("M2M") communication over a cellular wireless network has seen recent rapid growth. This growth results in extra demand for the limited numbering and addressing resources used in the cellular wireless networks. One of the main and potentially limiting resources for the rising demand for M2M communication in cellular wireless networks is the international mobile subscriber identity ("IMSI"). Each terminal communicating over a fourth generation ("4G") cellular wireless network is allocated an IMSI to uniquely identify the terminal to the network.

The IMSI is primarily used during the initial phase of terminal connectivity to a network. A main purpose is to locate a terminal's subscription profile in a home subscriber server ("HSS"). The current structure of the IMSI allows a network operator in a certain country to theoretically support up to one billion subscribers, assuming a nine-digit IMSI. This number, however, includes both human-to-human ("H2H") and M2M terminals, and cannot be scaled to support the projected massive growth of M2M terminals communicating over wireless 4G networks.

Despite continued effort, these limitations have now become substantial hindrances for efficient wide-scale deployment of mobile radio access technology. Accordingly, what is needed in the art is an approach that overcomes the deficiencies in the present communication systems.

SUMMARY OF THE INVENTION

These and other problems are generally solved or circumvented, and technical advantages are generally achieved, by advantageous embodiments of the present invention, including a system and method to accommodate an attach request for machine-to-machine ("M2M") terminals including a machine international mobile subscriber identity ("M-IMSI") in communication networks. In one embodiment, an apparatus of the system is operable to process the M-IMSI attach request from the M2M terminal. The apparatus includes a processor and memory including computer program code configured to receive the attach request from the M2M terminal including a machine identity type and an assigned M-IMSI of the M2M terminal, check an identity type of the attach request and transmit the attach request to a machine home server ("MHS") if the identity type is the M-IMSI. The processor and memory including computer program code of the apparatus are also configured to receive an authenticate response from the MHS indicating acceptance or rejection of the attach request and provide the authenticate response to the M2M terminal.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems and modules associated with a modified attach procedure for M2M terminals.

The modified attach procedure for M2M terminals will be described with respect to exemplary embodiments in a specific context, namely, a scalable addressing scheme for M2M terminals that can add a large number of unique M2M terminal identities (a machine international mobile subscriber identity ("M-IMSI")) for each network code in each operator network. While the principles will be described in the environment of a cellular communication network, any environment that may benefit from the modified attach procedure that enables addition of a number of unique M2M terminal identities for each network code in each operator network is well within the broad scope of the present disclosure.

Figure 1:
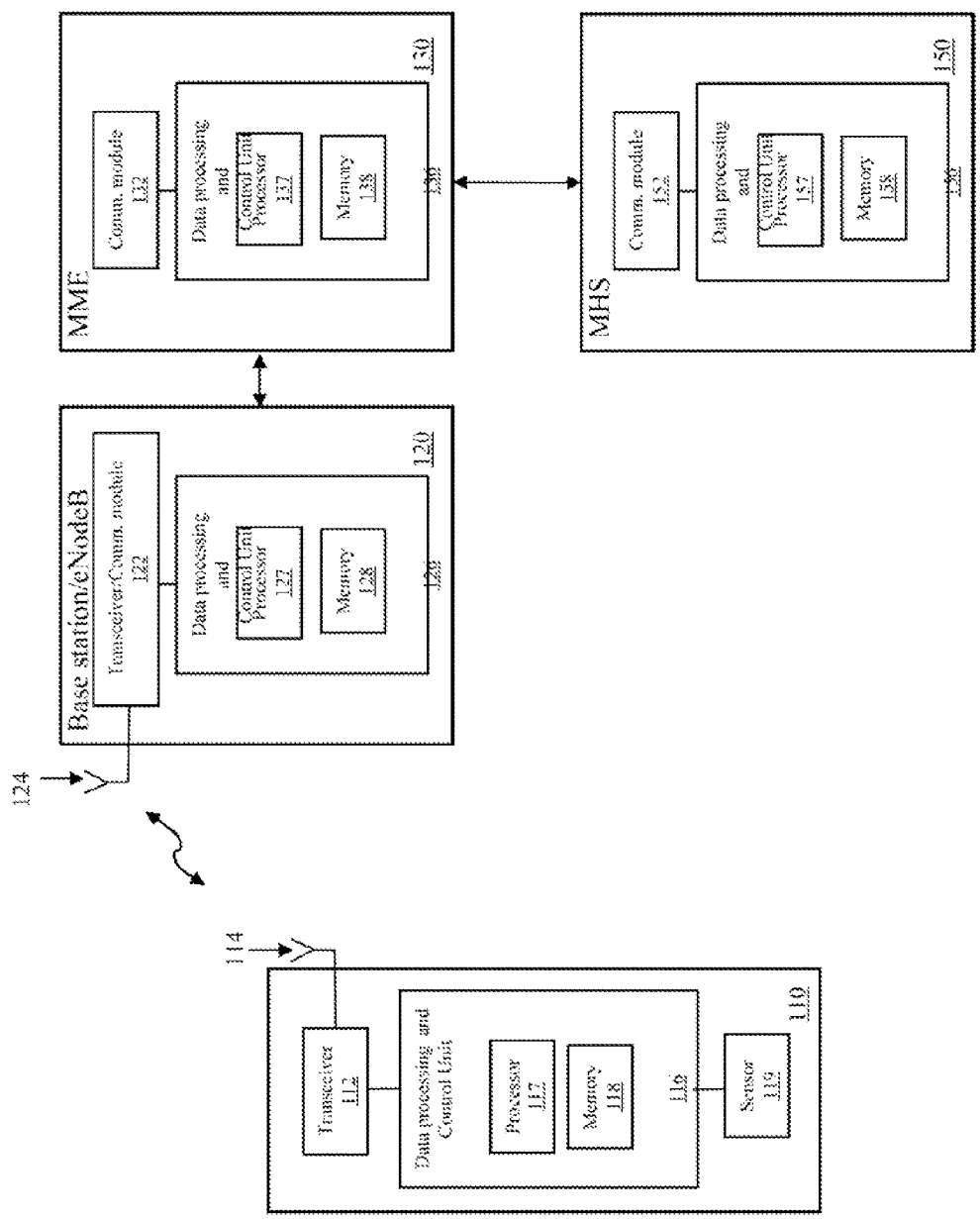
FIGS. 1 and 2 illustrate system-level diagrams of embodiments of a communication system employable with an attach procedure for machine-to-machine ("M2M") terminals.

Turning now to FIG. 1, illustrated is a system-level diagram of an embodiment of a communication system employable with an attach procedure for M2M terminals. The communication system may form a portion of a cellular terrestrial radio access network and includes an M2M terminal 110 communicating wirelessly and bidirectionally with an access point such as a base station (e.g., an eNodeB) 120 coupled to a mobility management entity ("MME") 130. The MME 130 is coupled, in turn, to a machine home server ("MHS") 150 that provides communication with a public switched telecommunications network ("PSTN"). The base station 120 and MME 130 may be provided by and represent communication nodes for communications systems of the service providers.

The M2M terminal 110 is formed with a transceiver 112 coupled to an antenna 114. Of course, multiple antennas may be employed to advantage. The M2M terminal 110 includes a data processing and control unit 116 formed with a processor 117 coupled to a memory 118. Of course, the M2M terminal 110 may include other elements such as a keypad, a display, interface devices, etc. The M2M terminal 110 is generally a self-contained wireless communication device intended to be mounted in a fixed position, or can be movable.

The M2M terminal 110 is also formed with a sensor (or a plurality of sensors) 119 configured to sense/measure a local condition such as a temperature, a utilization of a commodity supplied by a utility such as natural gas or an alarm condition. The M2M terminal 110 is configured to encode the sensed/measured local condition and to transmit wirelessly an encoded signal representative of the sensed/measured local condition to the base station 120 such as in response to an alarm condition or an inquiry by a utility.

The base station 120 is formed with a transceiver/communication module 122 coupled to an antenna 124. Of course, multiple antennas may be employed to advantage. Also, the transceiver/communication modules 122 is configured for wireless and wired communication. The base station 120 may provide point-to-point and/or point-to-multipoint communication services. The base station 120 includes a data processing and control unit 126 formed with a processor 127 coupled to a memory 128. Of course, the base station 120 includes other elements such as interface devices, etc.

The base station 120 may host functions such as radio resource management. For instance, the base station 120 may perform functions such as Internet protocol ("IP") header compression and encryption of user data streams, ciphering of user data streams, radio bearer control, radio admission control, connection mobility control, dynamic allocation of communication resources to M2M terminal 110 in both the uplink and the downlink, and measurement and reporting configuration for mobility and scheduling.

The MME 130 is formed with a communication module 132. The MME 130 includes a data processing and control unit 136 formed with a processor 137 coupled to a memory 138. Of course, the MME 130 includes other elements such as interface devices, etc. The MME 130 generally provides access to a telecommunication network such as a PSTN. Access may be provided using fiber optic, coaxial, twisted pair, microwave communications, or similar link coupled to an appropriate link-terminating element. The MHS 150 is formed with communication module 152. The MHS 150 also include data processing and control unit 156 formed with processor 157 coupled to a memory 158. Of course, the MHS 150 includes other elements such as interface devices, etc.

The data processing and control units identified above provide digital processing functions for controlling various operations required by the respective unit in which it operates, such as radio and data processing operations to conduct bidirectional wireless communications between the MME and a respective user equipment or M2M terminal coupled to the respective base station. The processors in the data processing and control units are each coupled to memory that stores programs and data of a temporary or more permanent nature.

The processors in the data processing and control units, which may be implemented with one or a plurality of processing devices, performs functions associated with its operation including, without limitation, precoding of antenna gain/phase parameters, encoding and decoding of individual bits forming a communication message, formatting of information and overall control of a respective communication element. Exemplary functions related to management of communication resources include, without limitation, hardware installation, traffic management, performance data analysis, configuration management, security, billing, and the like. The processors in the data processing and control units may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories in the data processing and control units may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication element to perform its intended tasks. Of course, the memories may form a data buffer for data transmitted to and from the same. In the case of user equipment or the M2M terminal, the memories may store applications (e.g., virus scan) for use by the same. Exemplary embodiments of the system, subsystems, and modules as described herein may be implemented, at least in part, by computer software executable by processors of the data processing and control units, or by hardware, or by combinations thereof.

The transceivers modulate information onto a carrier waveform for transmission by the respective communication element via the respective antenna(s) to another communication element. The respective transceiver demodulates information received via the antenna(s) for further processing by other communication elements. The transceiver is capable of supporting duplex operation for the respective communication element. The communication modules further facilitate the bidirectional transfer of information between communication elements.

An IMSI is presently allocated for each mobile subscriber/user equipment to uniquely identify the subscriber in the wireless cellular network. In the context of M2M terminals, each terminal is considered to be a mobile subscriber and has a unique IMSI. The structure of the IMSI is illustrated below in Table 1. The IMSI includes a mobile country code ("MCC"), a mobile network code ("MNC") and a mobile subscriber identification number ("MSIN"). The MCC is three digits, the MNC is two or three digits, and the MSIN is nine or 10 digits.

TABLE 1

| MCC | MNC | MSIN |
| --- | --- | --- |
| 111 | 111 | 1111111111 |

As introduced herein, a modified IMSI range is created for M2M terminals. The modified IMSI range is used to facilitate M2M terminal support in a modified architecture for an evolved packet core ("EPC"). The exiting initial attach procedure is also modified to recognize and handle the extended IMSI range. The IMSI-like identity for the M2M terminals introduced herein is referred to as a machine-IMSI ("M-

IMSI"). The M-IMSI is used for unique and global identification of M2M terminals engaged in M2M communication. The existing IMSI structure is reused in the M-IMSI to reduce impact on call processing in existing signaling entities.

The structure of the M-IMSI is illustrated below in Table 2. The M-IMSI includes a machine mobile country code ("MMCC"), a machine mobile network code ("MMNC") and a machine mobile subscriber identification number ("MMSIN"). The MMCC is three digits, the MMNC is three digits, and the new MMSIN is nine digits.

TABLE 2

| MMCC | MMNC | MMSIN |
|------|------|-------|
| 111  | 111  | 111111111 |

The structure of the M-IMSI is hierarchical to facilitate quick identification of the home network of the M2M terminals. The MMCC is employed to identify the country in which the home network is based. The MMNC is employed to identify the network of the service provider or operator with whom the terminal has a service contract. The MMSIN is employed to uniquely identify the M2M terminal within the operator network.

An evolved packet system ("EPS") mobile identity type of M-IMSI is added. The M-IMSI EPS identity type value is chosen from the currently reserved values as shown below in Table 3. The EPS mobile identity type currently uses three of a possible eight values that the three-bit field can support.

TABLE 3

| Bit 3 | Bit 2 | Bit 1$^a$ | Type of Identity |
|-------|-------|-------|------------------|
| 0 | 0 | 1 | IMSI |
| 0 | 1 | 0 | M-IMSI |
| 1 | 1 | 0 | global unique temporary identifier ("GUTI") |
| 0 | 1 | 1 | international mobile station equipment identity ("IMEI") |

All other values are reserved.

The M-IMSI is stored in the M2M terminal and in an MHS, a home subscriber server ("HSS")-like EPC entity. The MHS includes a master database that contains profile and subscription information of the M2M terminal. The MHS is analogous to the HSS in the existing H2H communication paradigm. The MHS performs authentication and authorization of the M2M terminal, and handles requests for the M2M terminal profile from other entities such as the MME, which is a control node in a Third Generation Partnership Project ("3GPP") access network that is responsible for authenticating a user equipment or M2M terminal by interacting with an HSS.

Figure 2:
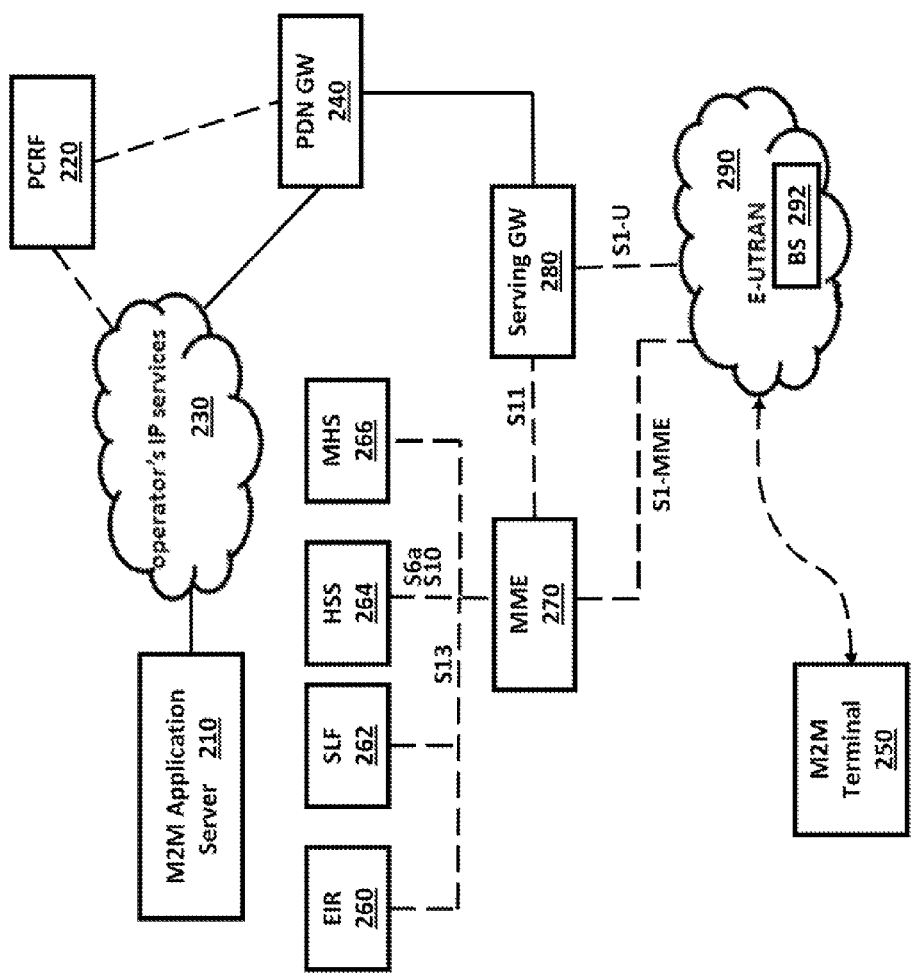

Turning now to FIG. 2, illustrated is a system-level diagram of an embodiment of a communication system employable with an attach procedure for M2M terminals. The communication system represents a modified EPC architecture with the addition of an MHS. It should be noted that the solid lines represent data lines and the dashed lines represent signaling lines in the illustrated embodiment.

An M2M terminal 250 couples wirelessly to a public land mobile network ("PLMN") through an access point such as a base station (e.g., an eNodeB) 292 operating in an evolved universal terrestrial radio access network ("E-UTRAN") 290. An MME 270 performs idle-mode M2M terminal 250 tracking and paging procedures, including retransmissions, and is involved in the bearer activation/deactivation process. The MME 270 chooses a serving gateway ("serving GW") 280 for the M2M terminal 250 at initial attach and at times of intra-Long Term Evolution ("LTE") handovers involving core network ("CN") node relocation. The MME 270 authenticates the M2M terminal 250 and generates and allocates temporary M2M terminal 250 identities, and enforces M2M terminal 250 roaming restrictions. The MME 270 interfaces with an MHS 266 in an analogous manner as an interface to a HSS 264. An exemplary difference is that the MME 270 sends queries related to the M2M terminal 250 that are identified by M-IMSIs to the MHS 266 as opposed to the HSS 264.

The HSS 264 provides a centralized database that contains user-related and subscription-related information. The HSS 264 supports functionalities such as mobility management, call and session establishment, user authentication and access authorization. A subscriber location function ("SLF") 262 provides information about the HSS 264 associated with a particular M2M terminal 250 profile. An equipment identity register ("EIR") 260 maintains a list of communication devices identified by an IMEI or an IMSI and, in an embodiment, M2M terminals 250 by an M-IMSI, which are to be excluded from a network or are to be monitored. The EIR 260 enables tracking of stolen or missing M2M terminal 250.

The serving GW 280 routes and forwards user data packets to the Internet, while also acting as a mobility anchor for the user plane during inter-eNodeB or base station 292 handovers, and as an anchor for mobility between LTE and other 3GPP technologies. For idle state M2M terminals 250, the serving GW 280 terminates the downlink data path and then triggers paging when downlink data arrives for the M2M terminal 250.

A packet data network gateway ("PDN GW") 240 provides connectivity from the M2M terminals 250 to external packet data networks by being a point of exit and entry for M2M terminal 250 traffic. The M2M terminal 250 may have simultaneous connectivity with more than one PDN GW 240 for accessing multiple packet data networks. The PDN GW 240 performs policy enforcement, packet filtering for each M2M terminal 250, charging support, lawful interception and packet screening. A policy and charging rules function ("PCRF") 220 determines policy rules in a communication network.

An M2M application server 210 is an application-specific server used by an operator of the application/functionality that the M2M terminal 250 supports, and is connected to a packet data network through an operator's Internet protocol ("IP") services network 230. For example, if the M2M terminal 250 monitors a security condition in a home residence, then the M2M application server 210 would be a server provided by a security monitoring company such as ADT® Security Systems.

The initial attach procedure for an M2M terminal 250 is modified to support the M-IMSI. The user equipment or the M2M terminal 250 initiates the attach procedure by sending an attach request message to the MME 270. The H2H user equipment set an identity type in the EPS mobile identity to "IMSI," as is currently done, and include their assigned IMSI. The M2M terminal 250 sets the identity type in the EPS mobile identity to "M-IMSI," and includes their assigned M-IMSI. The MME 270 then checks the identity type in the EPS mobile identity of the received attach request message and sends profile-related queries to the HSS 264 if the identity type is IMSI, or to the MHS 266 if the identity type is M-IMSI. The MME 270 accepts or rejects the attach request based on a response received either from the HSS 264 for H2H communication, or from the MHS 266 for M2M communication. The rest of the processing of the attach request, such as default bearer setup, remains unchanged.

Figure 3:
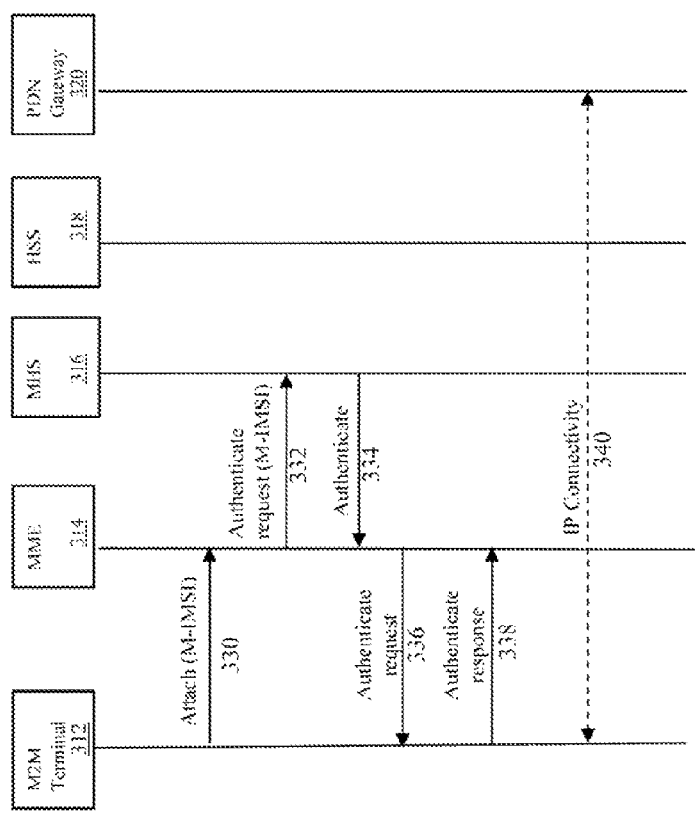
FIG. 3 illustrates an exemplary message flow of an attach procedure for M2M terminals.

Turning now to FIG. 3, illustrated is an exemplary message flow of an attach procedure for M2M terminals. FIG. 3 illustrates an M2M terminal 312, an MME 314, an MHS 316, an HSS 318, and a PDN GW 320. The attach procedure begins with attach request 330 sent from the M2M terminal 312 to the MME 314 that includes a machine identity type and an assigned M-IMSI. The MME 314 provides an authenticate request 332 to the MHS 316 including the M-IMSI. The MHS 316 returns an authenticate message 334 to the MME 314. The M2M terminal 312 receives an authenticate request 336 from the MME 314 and provides an authenticate response 338 back to the MME 314. The result of these exchanges produces IP connectivity 340 between the M2M terminal 312 and the PDN GW 320 to further communication between the M2M terminal 312 and an application operating on a server (not shown) coupled to the Internet.

Other signaling messages, such as an identity response for a user equipment (e.g., a cellular telephone), are handled in a similar way. The MME 314 forwards the user equipment (or the M2M terminal 312) responses to the HSS 318 (or to the MHS 316) based on whether the identity type in the EPS mobile identity is IMSI (or M-IMSI).

Figure 4:
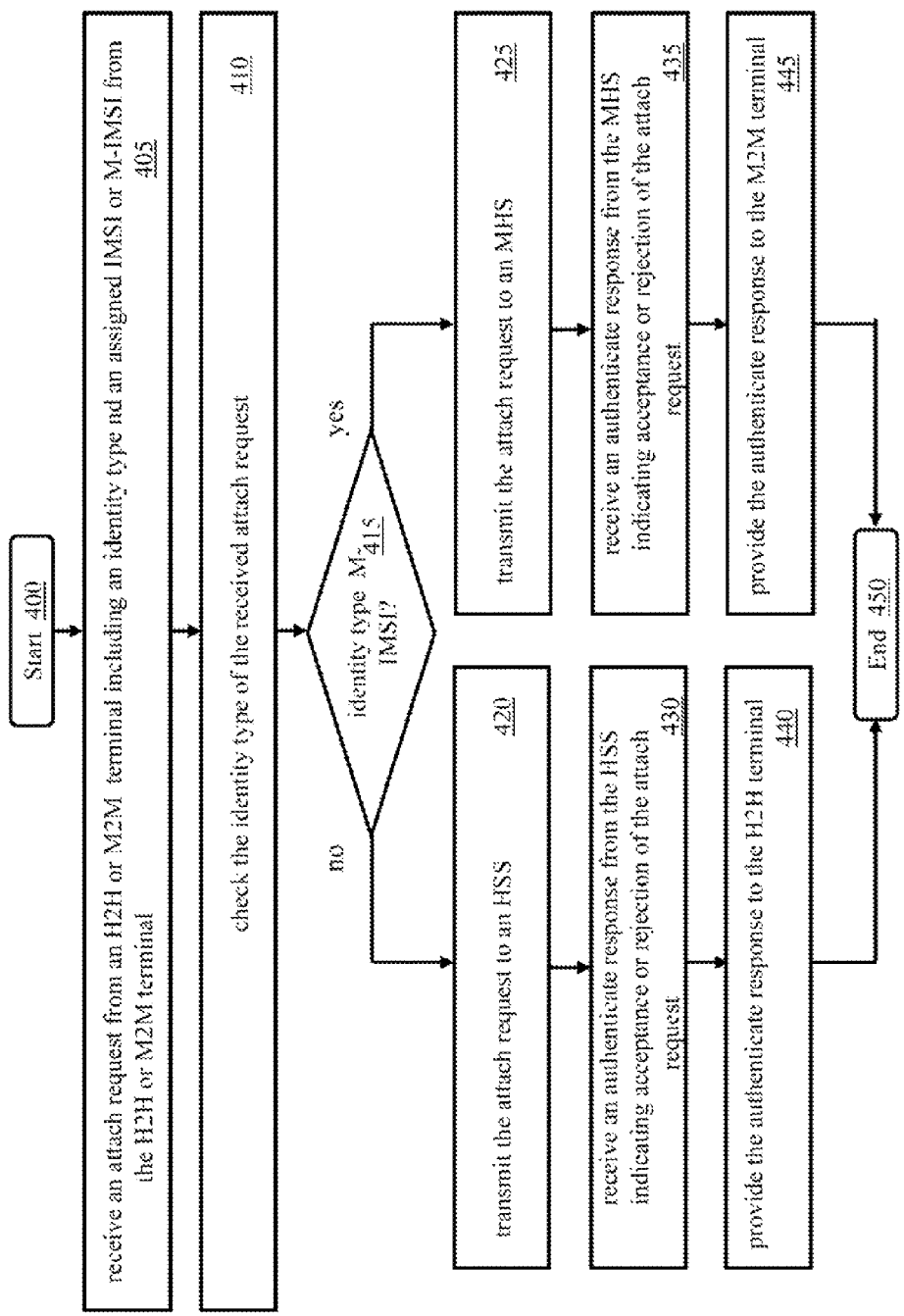
FIG. 4 illustrates a flow diagram of an embodiment of a method of operating a mobility management entity ("MME")

Turning now to FIG. 4, illustrated is a flow diagram of an embodiment of a method of operating an MME. The method is directed to a process for a response to an attach request from a M2M terminal. The method begins in a start step or module 400. In a step or module 405, the MME receives an attach request from an H2H or an M2M terminal including an identity type and an assigned IMSI or M-IMSI from the H2H or M2M terminal. In a step or module 410, the MME checks the identity type of the received attach request. In a step or module 415, if the identity type is M-IMSI, the method proceeds to a step or module 425. In the step or module 425, the MME transmits the attach request to an MHS. In a step or module 435, the MME receives an authenticate response from the MHS indicating acceptance or rejection of the attach request. In a step or module 445, the MME provides the authenticate response to the M2M terminal. The method ends in a step or module 450.

In the step or module 415, if the identity type is not M-IMSI, the method proceeds to a step or module 420. In the step or module 420, the MME transmits the attach request to an HSS. In a step or module 430, the MME receives an authenticate response from the HSS indicating acceptance or rejection of the attach request. In a step or module 440, the MME provides the authenticate response to the H2H terminal. The method ends in the step or module 450.

Figure 5:
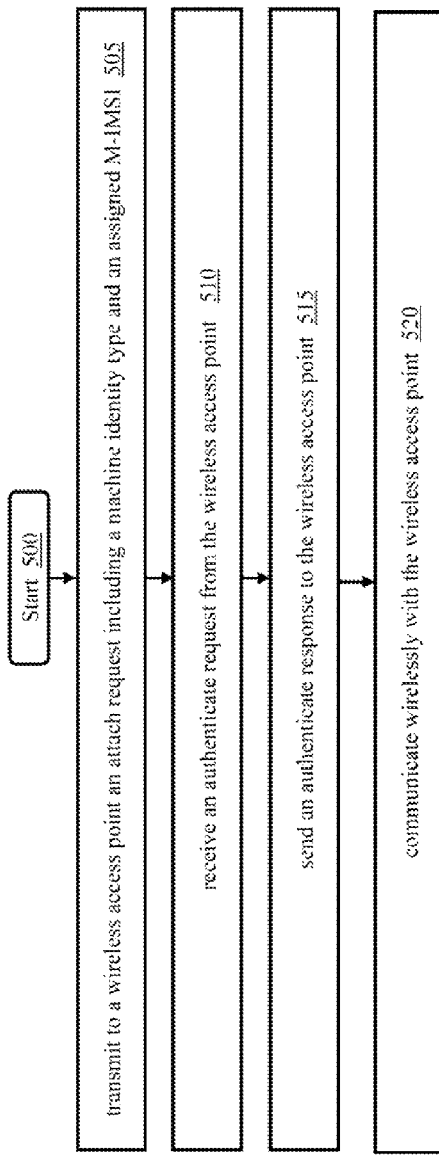
FIG. 5 illustrates a flow diagram of an embodiment of a method of operating an M2M terminal.

Turning now to FIG. 5, illustrated is a flow diagram of an embodiment of a method of operating an M2M terminal. The method is directed to a process to enable an M2M terminal to communicate wirelessly with an access point such as a base station. The method begins in a start step or module 500. In a step or module 505, the M2M terminal transmits an attach request to the access point including a machine identity type and an assigned M-IMSI. In a step or module 510, the M2M terminal receives an authenticate response from the access point. In a step or module 515, the M2M terminal initiates wireless communication with the access point. The method ends in a step or module 520.

Figure 6:
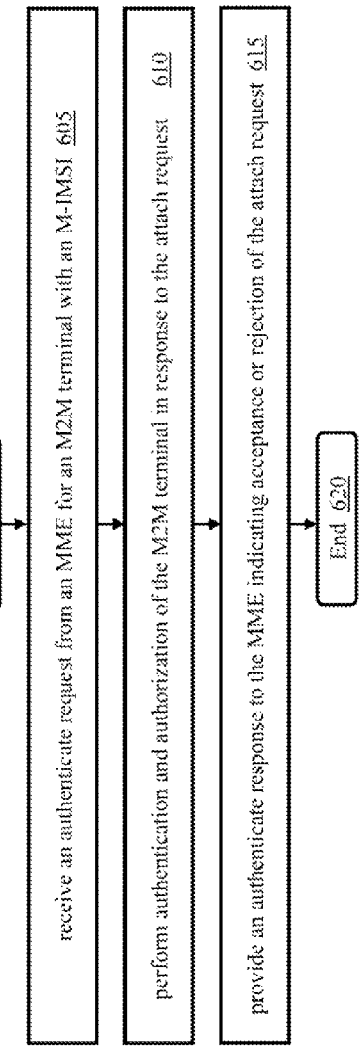
FIG. 6 illustrates a flow diagram of an embodiment of a method of operating a machine home server ("MHS").

Turning now to FIG. 6, illustrated is a flow diagram of an embodiment of a method of operating an MHS. The method is directed to a process to enable an MHS to perform authentication and authorization of an M2M terminal. The method begins in a start step or module 600. In a step or module 605, the MHS receives an attach request from an MME for an M2M terminal with an M-IMSI. In a step or module 610, the MHS performs authentication and authorization of the M2M terminal in response to the attach request. In a step or module 615, the MHS provides an authenticate response to the MME indicating acceptance or rejection of the attach request. The method ends in a step or module 620.

Thus, as introduced herein, a scalable addressing scheme is provided for M2M terminals that can add a multitude of unique M2M terminal identities for each network code in each operator network (e.g., a total of $10^{12}$ globally unique identities). One of the reserved values is used to add a multitude of new identities for each network code. Another range can easily be added by creating another new identity type to support a second M-IMSI-like type to add another multitude of unique identities for each network code (e.g., a total of $10^{12}$ globally unique identities). This characteristic makes the solution scalable for future expansion without significant changes to the existing call processing entities or to protocols currently in use. The scalability includes the addition of a MHS for each M-IMSI range added.

Therefore, a system and method is provided to accommodate a multitude of globally unique M-IMSI identities for M2M terminals and to allow the existing number of globally unique IMSI identities to be used for H2H terminals in its entirety in communication networks. In one embodiment in the environment of FIG. 1, an apparatus (embodied in an MME 130) of the system is operable to process an M-IMSI attach request from the M2M terminal 110. The apparatus includes a processor 137 and memory 138 including computer program code configured to receive the attach request from the M2M terminal 110 including a machine identity type and an assigned M-IMSI of the M2M terminal 110, check an identity type of the attach request and transmit the attach request to a MHS 150 if the identity type is the M-IMSI. The processor 137 and memory 138 including computer program code of the apparatus are also configured to receive an authenticate response from the MHS 150 indicating acceptance or rejection of the attach request and provide the authenticate response to the M2M terminal 110.

In another embodiment in the environment of FIG. 1, an apparatus (embodied in a M2M terminal 110) is operable to communicate wirelessly with an access point (e.g., a base station 120). The apparatus includes a processor 117 and memory 118 including computer program code configured to transmit to the access point 120 an attach request including a machine identity type and an assigned M-IMSI and receive an authenticate request from the access point 120. The processor 117 and memory 118 including computer program code of the apparatus are also configured to send an authenticate response to the access point 120 and communicate wirelessly with the access point 120.

In another embodiment in the environment of FIG. 1, an apparatus (embodied in a MHS 150) is operable to perform authentication and authorization of a M2M terminal 110. The apparatus includes a processor 157 and memory 158 including computer program code configured to receive an authenticate request from a MME 130 for an M2M terminal 110 with a machine identity type and an M-IMSI. The processor 157 and memory 158 including computer program code of the apparatus are also configured to perform authentication and authorization of the M2M terminal 110 in response to the attach request and provide an authenticate response to the MME 130 indicating acceptance or rejection of the attach request.

For a general understanding of communication systems, see 3GPP Technical Report 22.868 V8.0.0 (2007 March), 3rd Generation Partnership Project, Technical Specification Group Services and System Aspects, Study on Facilitating Machine to Machine Communication in 3GPP Systems; (Release 8), 3GPP Technical Specification 23.401 V11.0.0 (2011 December) Technical Specification 3GPP, Technical Specification Group Services and System Aspects, General Packet Radio Service ("GPRS") Enhancements for Evolved Universal Terrestrial Radio Access Network ("E-UTRAN") Access (Release 11), 3GPP Technical Specification 24.301 V11.1.0 (2011 December) Technical Specification 3GPP, Technical Specification Group Core Network and Terminals, Non-Access-Stratum ("NAS") Protocol for Evolved Packet System ("EPS"); Stage 3 (Release 11), which are incorporated herein by reference.

Program or code segments making up the various embodiments may be stored in a computer readable medium or transmitted by a computer data signal embodied in a carrier wave, or a signal modulated by a carrier, over a transmission medium. For instance, a computer program product including a program code stored in a computer readable medium (e.g., a non-transitory computer readable medium) may form various embodiments. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. An apparatus operable to process a machine international mobile subscriber identity (M-IMSI) attach request from a machine-to-machine (M2M) terminal, comprising:
    a processor; and
    memory including computer program code, said memory and said computer program code configured to, with said processor, cause said apparatus to perform at least said following:
        receive said attach request from said M2M terminal comprising a machine identity type and an assigned M-IMSI of said M2M terminal;
        check an identity type of said attach request to determine whether the identity type is an M-IMSI identity type or an IMSI identity type and transmit said attach request to a machine home server (MHS) if said identity type is said M-IMSI identity type;
        receive an authenticate response from said MHS indicating acceptance or rejection of said attach request; and
        provide said authenticate response to said M2M terminal.

2. The apparatus as recited in claim 1 wherein said M-IMSI includes a machine mobile country code (MMCC), a machine mobile network code (MMNC) and a machine mobile subscriber identification number (MMSIN).

3. The apparatus as recited in claim 2 wherein said MMCC is three digits, said MMNC is three digits and said MMSIN is nine digits.

4. The apparatus as recited in claim 1 wherein said MHS includes a database including profile and subscription information of said M2M terminal.

5. The apparatus as recited in claim 1 wherein said apparatus is embodied in a mobility management entity (MME).

6. A method operable to process a machine international mobile subscriber identity (M-IMSI) attach request from a machine-to-machine (M2M) terminal, comprising:
    receiving said attach request from said M2M terminal comprising a machine identity type and an assigned M-IMSI of said M2M terminal;
    checking an identity type of said attach request to determine whether the identity type is an M-IMSI identity type or an IMSI identity type and transmitting said attach request to a machine home server (MHS) if said identity type is said M-IMSI identity type;
    receiving an authenticate response from said MHS indicating acceptance or rejection of said attach request; and
    providing said authenticate response to said M2M terminal.

7. The method as recited in claim 6 wherein said M-IMSI includes a machine mobile country code (MMCC), a machine mobile network code (MMNC) and a machine mobile subscriber identification number (MMSIN).

8. The method as recited in claim 7 wherein said MMCC is three digits, said MMNC is three digits and said MMSIN is nine digits.

9. The method as recited in claim 6 wherein said MHS includes a database including profile and subscription information of said M2M terminal.

10. The method as recited in claim 6 wherein said method is operable on a mobility management entity (MME).

11. An apparatus operable to communicate wirelessly with an access point, comprising:
a processor; and
memory including computer program code, said memory and said computer program code configured to, with said processor, cause said apparatus to perform at least the following:
transmit to said access point an attach request comprising:
a machine international mobile subscriber identity (M-IMSI) identity type corresponding to machine-to-machine terminals that differs from an IMSI identity type corresponding to human-to-human terminals; and
an M-IMSI;
receive an authenticate request from said access point;
send an authenticate response to said access point; and
communicate wirelessly with said access point.

12. The apparatus as recited in claim 11 wherein said M-IMSI includes a machine mobile country code (MMCC), a machine mobile network code (MMNC), and a machine mobile subscriber identification number (MMSIN).

13. The apparatus as recited in claim 12 wherein said MMCC is three digits, said MMNC is three digits and said MMSIN is nine digits.

14. The apparatus as recited in claim 11 wherein said apparatus is embodied in a machine-to-machine (M2M) terminal.

15. A method to enable a terminal to communicate wirelessly with an access point, comprising:
transmitting to said access point an attach request comprising an assigned machine international mobile subscriber identity (M-IMSI) and an M-IMSI identity type corresponding to machine-to-machine terminals that differs from an IMSI identity type corresponding to human-to-human terminals;
receiving an authenticate request from said access point;
sending an authenticate response to said access point; and
communicating wirelessly with said access point.

16. The method as recited in claim 15 wherein said M-IMSI includes a machine mobile country code (MMCC), a machine mobile network code (MMNC), and a machine mobile subscriber identification number (MMSIN).

17. The method as recited in claim 16 wherein said MMCC is three digits, said MMNC is three digits and said MMSIN is nine digits.

18. The method as recited in claim 15 wherein said terminal is a machine-to-machine (M2M) terminal.

19. An apparatus operable to perform authentication and authorization of a machine-to-machine (M2M) terminal, comprising:
a processor; and
memory including computer program code, said memory and said computer program code configured to, with said processor, cause said apparatus to perform at least the following:
receive an attach request from a mobility management entity (MME) for an M2M terminal with a machine international mobile subscriber identity (M-IMSI) and an M-IMSI identity type corresponding to machine-to-machine terminals that differs from an IMSI identity type corresponding to human-to-human terminals;
perform authentication and authorization of said M2M terminal in response to the attach request; and
provide an authenticate response to said MME indicating acceptance or rejection of said attach request.

20. The apparatus as recited in claim 19 wherein said M-IMSI includes a machine mobile country code (MMCC), a machine mobile network code (MMNC), and a machine mobile subscriber identification number (MMSIN).

21. The apparatus as recited in claim 20 wherein said MMCC is three digits, said MMNC is three digits and said MMSIN is nine digits.

22. The apparatus as recited in claim 19 wherein said memory includes profile and subscription information of said M2M terminal.

23. The apparatus as recited in claim 19 wherein said apparatus is embodied in a machine home server (MHS).

24. A method operable to perform authentication and authorization of a machine-to-machine (M2M) terminal, comprising:
receiving an attach request from a mobility management entity (MME) for an M2M terminal with a machine international mobile subscriber identity (M-IMSI) and an M-IMSI identity type corresponding to machine-to-machine terminals that differs from an IMSI identity type corresponding to human-to-human terminals;
performing authentication and authorization of said M2M terminal in response to the attach request; and
providing an authenticate response to said MME indicating acceptance or rejection of said attach request.

25. The method as recited in claim 24 wherein said M-IMSI includes a machine mobile country code (MMCC), a machine mobile network code (MMNC), and a machine mobile subscriber identification number (MMSIN).

26. The method as recited in claim 25 wherein said MMCC is three digits, said MMNC is three digits and said MMSIN is nine digits.

27. The method as recited in claim 24 further comprising storing profile and subscription information of said M2M terminal.

28. The method as recited in claim 24 wherein said method is operable on a machine home server (MHS).

* * * * *

UNITED STATES PATENT AND TRADEMARK OFFICE
CERTIFICATE OF CORRECTION

| | | |
|---|---|---|
| PATENT NO. | : 8,880,033 B2 | Page 1 of 1 |
| APPLICATION NO. | : 13/745418 | |
| DATED | : November 4, 2014 | |
| INVENTOR(S) | : Isam Abdalla | |

It is certified that error appears in the above-identified patent and that said Letters Patent is hereby corrected as shown below:

On the Title Page

Item (72) under Inventor, delete "Isam Abdallas" and insert -- Isam Abdalla --, therefor.

Signed and Sealed this
Thirty-first Day of January, 2017

Michelle K. Lee
*Director of the United States Patent and Trademark Office*